United States Patent [19]

Van Wisse

[11] 4,281,948
[45] Aug. 4, 1981

[54] INDEXING MEANS

[75] Inventor: John R. Van Wisse, Caulfield, Australia

[73] Assignee: Albert Edward Armitage, Victoria, Australia

[21] Appl. No.: 42,635

[22] Filed: May 25, 1979

[51] Int. Cl.³ ..................................................... B23B
[52] U.S. Cl. ............................................. 408/3; 408/70
[58] Field of Search ................... 408/3, 62, 67, 68, 70, 408/18, 72, 124, 241 R, 241 B; 409/82, 136, 63; 407/11

[56] References Cited

U.S. PATENT DOCUMENTS

| | | | |
|---|---|---|---|
| 1,124,549 | 1/1915 | Stephenson | 408/70 |
| 1,125,351 | 1/1915 | Liebig | 408/70 |
| 2,388,779 | 11/1945 | Boehmler | 408/56 |
| 2,757,560 | 8/1956 | Ridgway | 408/3 |
| 3,071,029 | 1/1963 | Chesney | 408/3 |
| 3,828,646 | 8/1974 | Borse | 408/56 |
| 4,147,232 | 4/1979 | Gaunt et al. | 408/56 |

Primary Examiner—Harrison L. Hinson
Attorney, Agent, or Firm—Stevens, Davis, Miller & Mosher

[57] ABSTRACT

An apparatus for drilling holes through batches of paper, the apparatus having a vertically movable drilling head, a movable table for supporting the batch of paper through which the holes are to be drilled at predetermined positions, and an indexing means incorporating elongate indexing members with holes or recesses provided therein corresponding to the positioning and spacing of the holes to be drilled, and a locating pin arrangement associated with and movable with the table and adapted for engagement in respective holes or recesses in a particular indexing member to set the table at the required positions for drilling operations. In one embodiment the locating pin arrangement is manually retracted and relocated, while in another embodiment the retraction and relocation is facilitated semi-automatically after each drilling operation.

16 Claims, 10 Drawing Figures

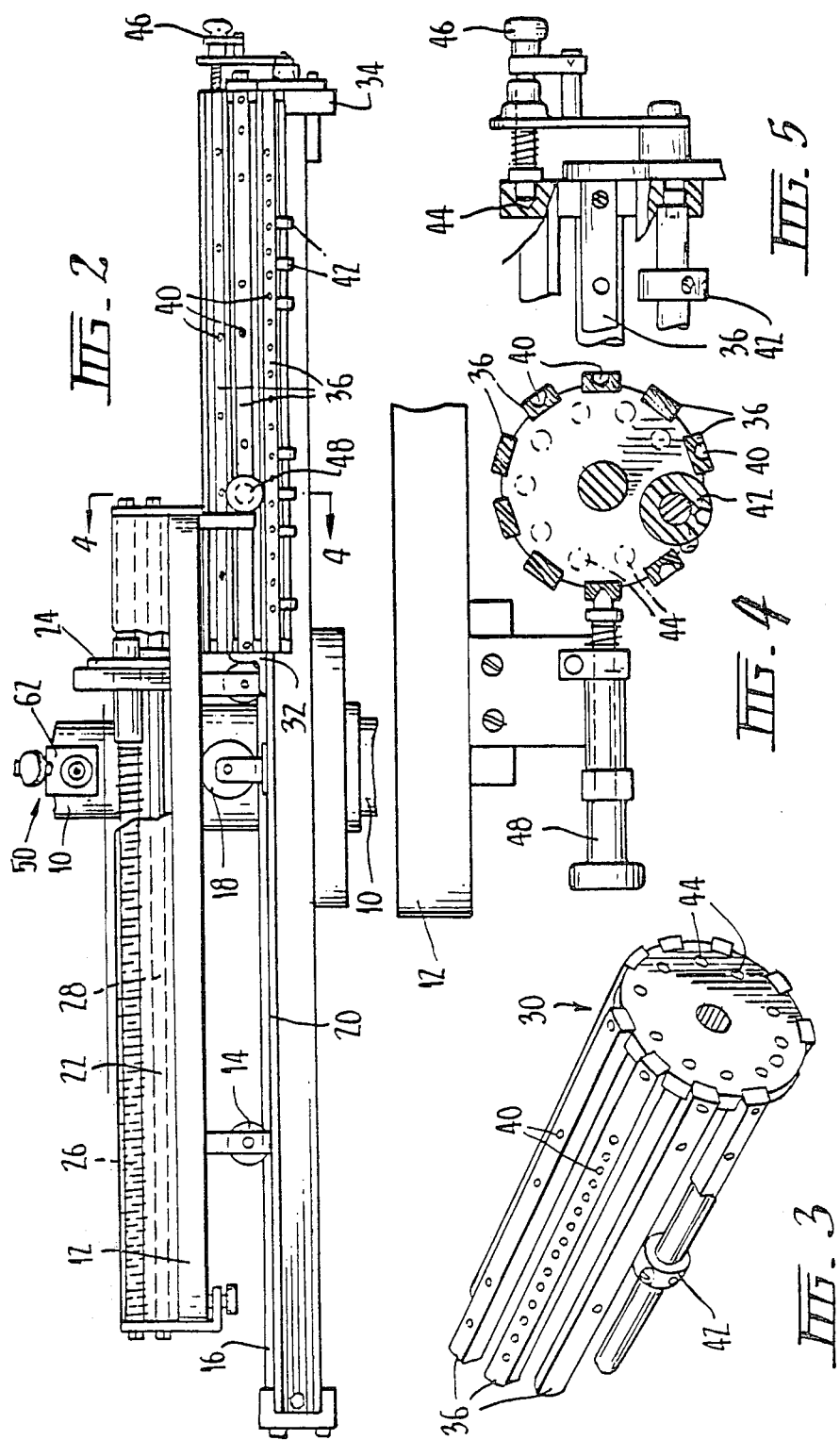

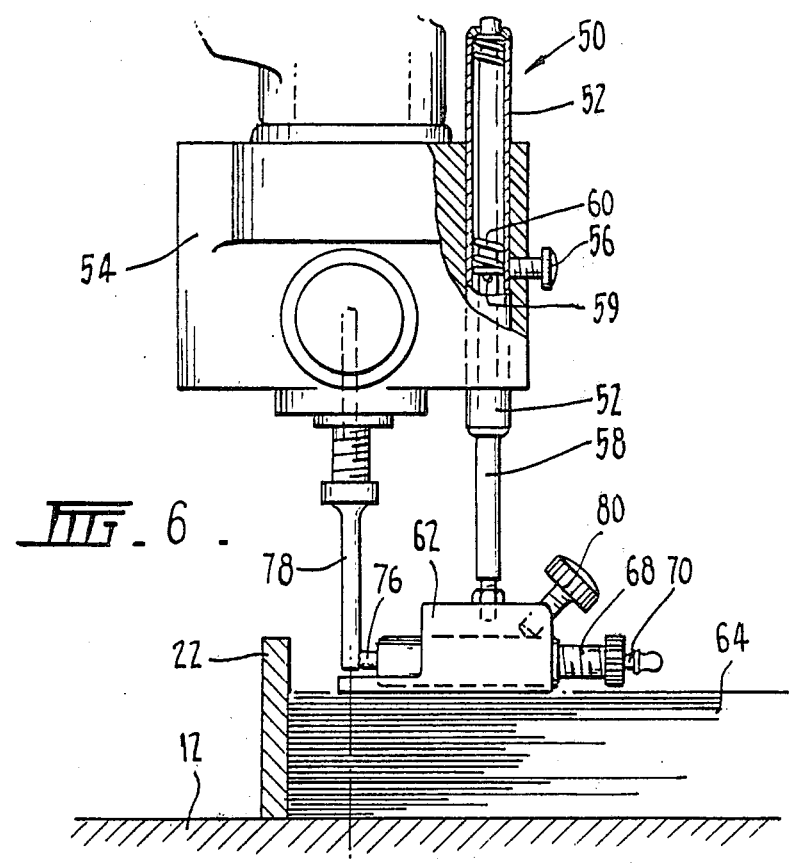
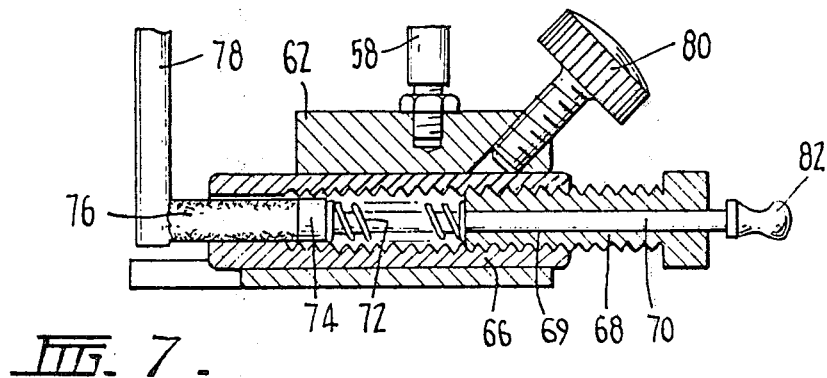

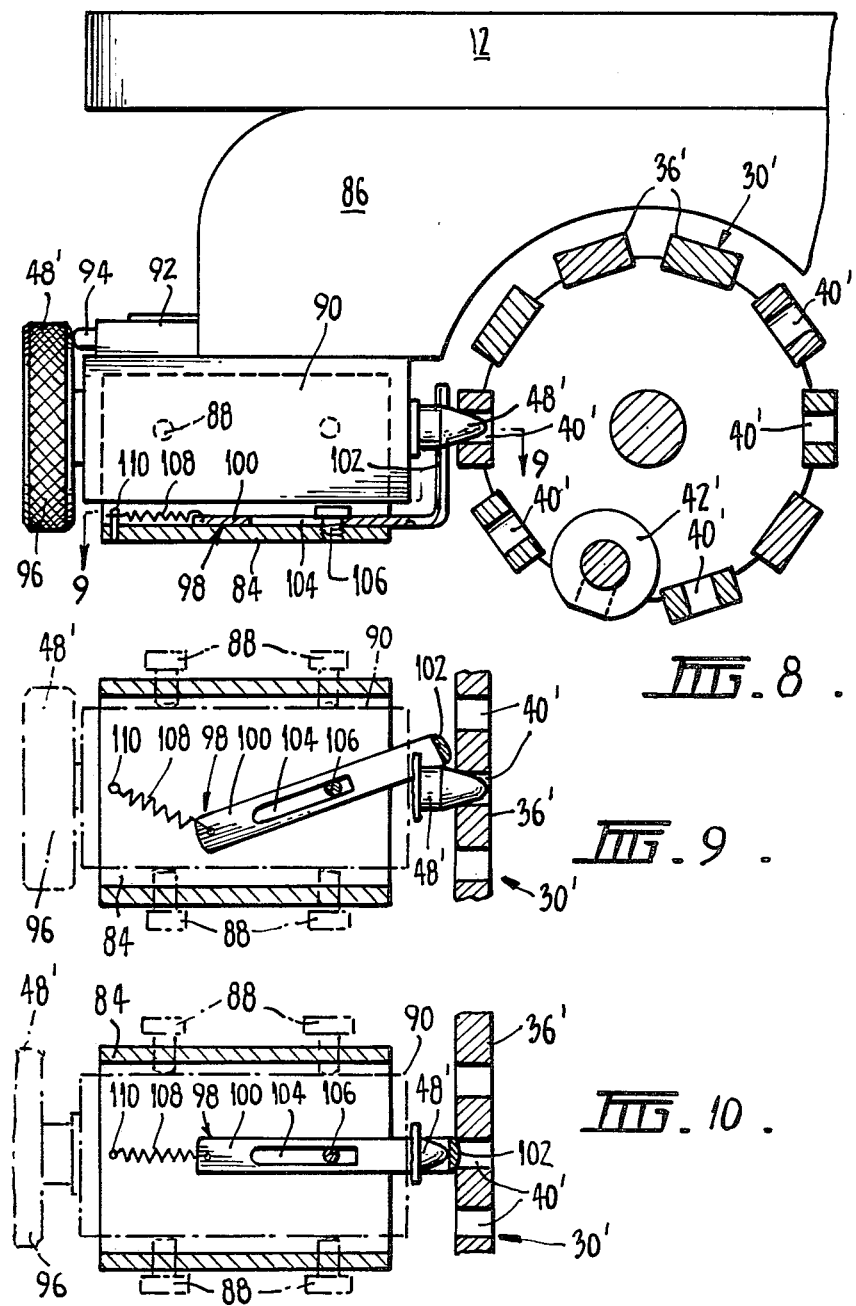

INDEXING MEANS

The present invention relates to drilling apparatus in general and paper drilling apparatus in particular.

Paper stationery is customarily provided with an arrangement of holes along its left hand margin to enable it to be fitted into files and binders. There are a number of different types of files and binders on the market and different arrangements of holes are required to fit the different types of files and binders. This can cause a problem in the printing of, for example, headed notepaper. Printed stationery is customarily provided with the required arrangement of holes by means of a paper drilling apparatus. However, because the required arrangement of holes varies from batch to batch the paper drilling apparatus has to be reset between batches. The process of resetting can occupy more time than the actual drilling process. Thus, the cost of a batch of printed stationery can be inordinately increased by the drilling process. This problem has existed particularly in small printers' works for many years.

The present invention provides an apparatus for drilling, particularly for drilling paper, in which the time spent on presetting is reduced. The present invention also provides an indexing attachment for a drilling apparatus.

In accordance with the present invention there is provided a drilling apparatus comprising a vertically movable drilling head and a table for receiving material to be drilled, the drilling head and table being laterally movable relative to one another, wherein there is attached to the apparatus an indexing means having a plurality of rows of indexing members such as holes or recesses of preset spacing, and engaging means for step wise indexing engaging with the indexing members of a selected row, whereby the material can be drilled with a desired arrangement of holes at a pre-set spacing.

Preferably, the drill head is laterally fixed and the table is movable in the lateral direction. In this case the indexing means is mounted so as to engage indexing engagement means associated with the table. However, it must be understood that the drill head can alternatively be laterally movable and the table fixed in which case the indexing means would engage with an indexing engagement means associated with the drill head.

The present invention also provides an indexing attachment for a drilling apparatus comprising an indexing means having a plurality of rows of indexing members such as holes or recesses of preset spacing, means for attaching the indexing means to a drilling apparatus, and means for step wise indexing engagement with the indexing members of a selected row.

The present invention further provides a drilling apparatus having means for lubricating a drill bit, in use, which means comprises means for urging a lubricating stick of solid lubricant into engagement with a drill bit.

As indicated above the present invention has particular reference to the drilling of batches of printed stationery although it is applicable to the drilling of batches of any sort of paper or to the drilling of other materials.

The present invention will now be described by way of example, with reference to the accompanying drawings, in which:

FIG. 2 is a front elevation of the table of FIG. 1;

FIG. 3 is a perspective view of the indexing attachment shown in FIG. 1;

FIG. 4 is a section taken along the line 4—4 of FIG. 2;

FIG. 5 is a section taken along the line 5—5 of FIG. 1;

FIG. 6 is a side elevation, partially broken away of the drilling machine of FIG. 1 showing in detail a lubricating attachment;

FIG. 7 is a vertical sectional view to an enlarged scale through part of the lubricating attachment shown in FIG. 6;

FIG. 8, is a section view similar to that of FIG. 4 showing a modified form of indexing arrangement;

FIG. 9, is a section view taken along line 9—9 of FIG. 8, showing the arrangement in one operating position; and FIG. 10, is a view similar to that of FIG. 9 showing the arrangement in another operating position.

Figure 1:
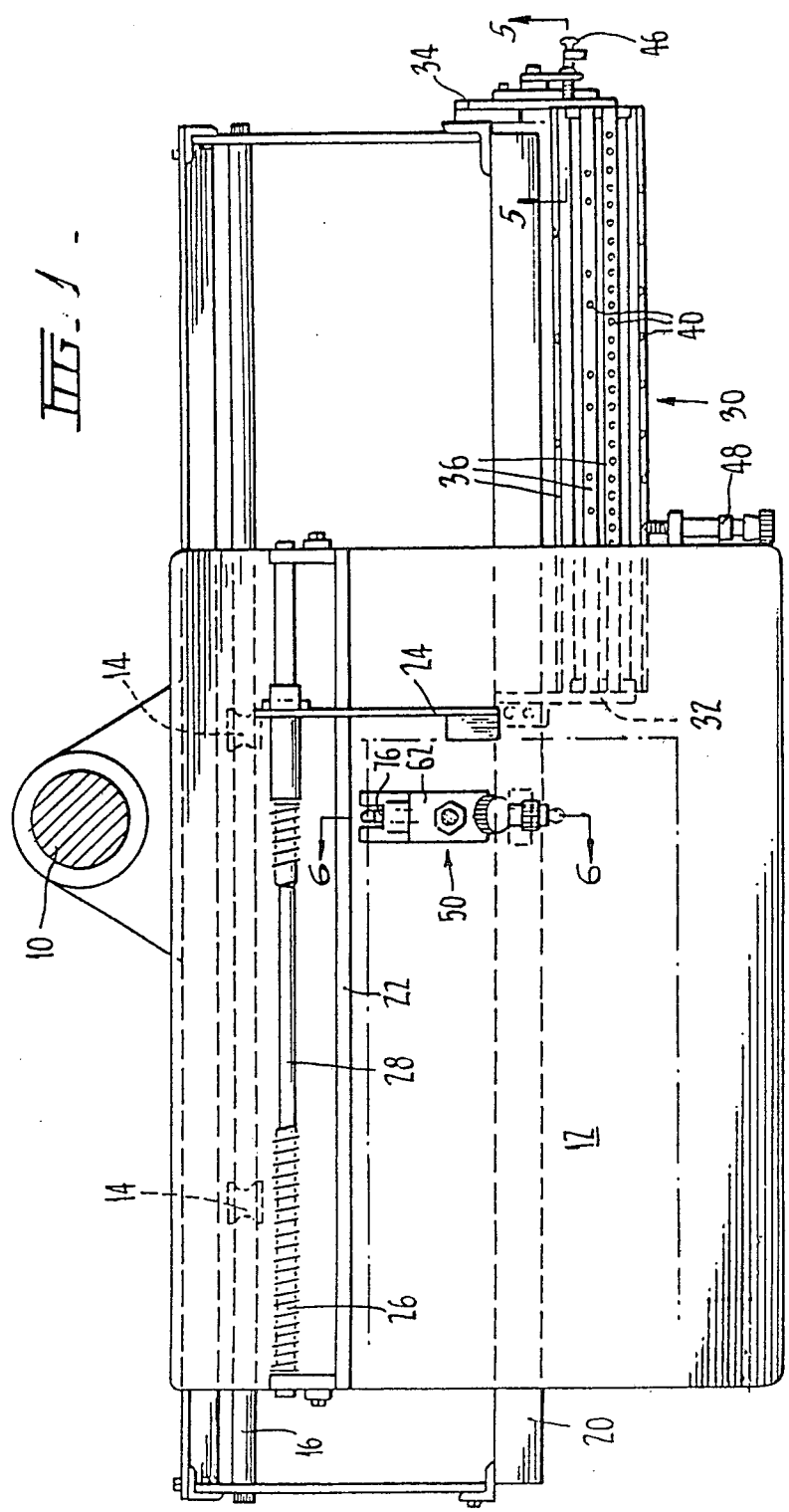
FIG. 1 is a plan view of a portion of a drilling machine having a laterally movable table with an indexing attachment in accordance with the present invention.

In FIGS. 1 and 2 of the drawings, there is shown the lower part only of a stem 10 which carries a drilling head (not shown), and a table 12 which is laterally movable. Towards the rear (as seen in FIG. 2) the table 12 has a pair of wheels 14 mounted on its underside. The wheels 14 are flanged and ride on a circular rod 16. Towards the front (as seen in FIG. 2) the table is supported on a single unflanged wheel 18 which is mounted on a bar 20.

A vertical plate 22 is mounted across the width of the table 12 and provides a backing for batches of paper being drilled.

Further, an adjustable plate 24 is mounted at right angles to the plate 22. In use, a side of a batch of paper is located against the adjustable plate 24. The adjustable plate 24 extends behind the plate 22 and is threadedly engaged with a threaded rod 26. The position of the adjustable plate 24 is adjusted in use by movement on the threaded rod 26 to accommodate different sizes of paper.

Below the threaded bar 26 is located an unthreaded bar 28 on which are mounted adjustable stops (not shown) which provide conventional means for setting of the position of the table for drilling.

A generally cylindrical indexing drum 30 is mounted at one end of the bar 20 intermediate its ends by means of a bracket 32 and at the other end to the end of the bar 20 remote from the table 12 by means of a bracket 34.

The indexing drum 30 is located below the table 12 and comprises a plurality of recessed strips 36 as can be seen more clearly in FIG. 3. Each strip 36 contains a plurality of recesses 40 which are spaced apart by a predetermined distance to enable the drilling apparatus to drill batches of paper in accordance with standard spacing found in files or binders without the need to pre-set the machine.

As can be seen in FIG. 3 the indexing drum 30 may also include a strip with conventional pre-setting spacers 42 to enable the apparatus to drill holes with unconventional spacings. This is an alternative to the rod 28 with spacers.

At the remote end from the table 12 the indexing drum 30 contains a plurality of notches 44 corresponding to a respective strip 36. The notches 44 are arranged for engagement with a spring biased finger 46 mounted on the bracket 34 as can be seen more clearly in FIG. 5.

A spring biased locating pin 48 as can be seen more clearly in FIG. 4 is mounted to the underside of the table 12 and is arranged for indexing engagement with each member of the row of recesses 40 in a strip 36.

In use a batch of paper to be drilled is placed on the table 12 with two sides on engagement with the plates 22 and 24 to ensure correct alignment. The indexing drum 30 is rotated, upon withdrawing the finger 46 manually, to the position where the strip 36 with the desired arrangement of holes 40 is in alignment with the locating pin 48. The finger 46 is then released for engagement with the corresponding notch 44. In this way the position of the indexing drum 30 is fixed.

The table 12 is then traversed to the right as seen in FIGS. 1 and 2 until the locating pin 48 engages with a first recess 40. The table is stopped and the drill head lowered so that the drill bit can drill a hole through the batch of paper. Once this is done the locating pin 48 is retracted and the table traversed to the right until a second recess 40 is engaged at which point the process is repeated. The above steps are carried out for each hole in the strip 36.

When a batch of paper is required to be drilled with a different arrangement of holes the indexing drum is merely rotated until the corresponding notch 44 of the appropriate strip 40 is in engagement with the finger 46. Thus, batches of paper can be drilled with a wide variety of hole spacings without the need for a time consuming pre-setting operation. The indexing drum can be arranged for any standard hole spacing such as kalamazoo, standard five holes and standard two holes.

If an unconventional spacing has to be drilled the conventional spacers 42 can be used. The spacers 42 are set manually by means of a grub screw. Similar spacers on the bar 28 can be used as an alternative.

Further, the drilling apparatus of the present invention may be provided with a drill bit lubricating attachment 50 which is shown in detail in FIGS. 6 and 7.

As shown in FIGS. 6 and 7 the lubricating attachment 50 comprises a slidably mounted tube 52 located within the drilling head 54. The portion of the tube 52 is maintained by tightening a threaded locking bolt 56 mounted in the drill head 54. A rod 58 is movable mounted in the tube 52 and extends from the bottom of the tube 52. The rod 58 is spring urged downwardly by means of a spring 60 located within the tube 52. The rod 58 is provided with a stop 59 to prevent it from being ejected from the tube 52 when not in use.

At its lower end the rod 58 is threadedly attached to a boss member 62. The boss member 62 has a flat lower surface and is arranged through the spring 60 to press against the top surface of a batch of paper 64 being drilled. The height of the tube 52 is adjusted as required to accommodate batches of paper of different heights.

As can best be seen in FIG. 7 the boss member 62 contains a horizontal internally threaded tube 66. The internally threaded tube 66 has mounted within it an externally threaded adjusting member 68 with a knurled head. The adjusting member 68 contains a longitudinal aperture 69 extending through its entire length. A ram rod 70 extends through and beyond the aperture 69. In its portion extending beyond the aperture 69 the ram rod 70 has a spring 72 mounted around it. The spring 72 abuts against the inner end of the adjusting member 68 and against a lubricating member 74 containing a stick 76 of a solid lubricant. The spring 72 urges the stick 76 into engagement with a drill bit 78. The position of the adjusting member 68 may be varied as desired to provide an appropriate degree of pressure on the stick 76. The adjusting member is locked in position by a locking bolt 80 having a knurled head. The ram rod 70 is provided with a stop 82 at its free end to prevent it being pulled through the aperture 69 when the drill bit 82 is absent.

In use, the engagement of the stick 76 with the drill bit 78 causes lubricant to be applied to the drill bit 78 as it is rotated. The application of lubricant facilitates entry of the drill into the batch of paper being drilled.

In a modification of the indexing attachment of the present invention, and as shown in FIGS. 8 to 10 of the drawings, the operation of the locating pin 48 which is arranged for indexing engagement with a row of indexing recesses 40 is caused to operate automatically.

In accordance with this modified form of the attachment, the integers directly related to integers in the preceding embodiment have been identified by like numerals, with some slight variations, for example, the holes 40 in the respective strips 36 extend through the strips, rather than being blind holes as shown in the preceding embodiment.

In this modified arrangement, the locating pin arrangement 48 is received within a sub-housing 90, which is then supported within a main housing 84 which in turn is suspended from the table 12 by a support 86. As shown, the sub-housing 90 containing the locating pin arrangement 48 is clamped within the main housing 84 by pairs of screw members 88 on either side of the housing, and the screw members 88 allow for some variation of the lateral position of support in the main housing 84 for fine adjustment purposes. The main housing 84 carries a solenoid valve 92, the extreme end of the valve member 94 of which abuts against the inwardly facing side of the actuating knob 96 of the locating pin arrangement 48, and is adapted to extend, and therefore retract, the pin of the arrangement 48 from a recess 40 at specific times during operation of the attachment.

Referring to FIG. 9 of the drawings, the lower wall of the main housing 84 supports a spring biased link arrangement 98, which comprises a link member 100 bent at right angles to provide a locating pin engaging portion 102. The link member 100 has a elongate slot 104 formed therethrough extending lengthwise of the link, and receives a pivot member 106 in the form of a screw member as shown and about which the link member 100 can pivot. A tension spring 108 is connected between one end of the link member 100 and a fixed pin 110, and when the locating pin of the arrangement 48 is received within a hole 40 the spring biased link arrangement 98 adopts the position shown in FIG. 9 against the biasing effect of the tension spring 108.

The operation of this modified form of indexing attachment will now be described. With the locating pin of the arrangement 48' engaged within a hole 40' of the row in a selected strip 36' as shown in FIG. 9, the hole through the batch of paper at the position set by the indexing attachment, is drilled. The solenoid valve 92 is actuated in response to completion of the drilling of the hole, for example, by means of a contact switch actuated in response to raising of the drilling head after completion of the drilling. The locating pin of the arrangement 48' is automatically withdrawn from the hole 40' to the position shown in FIG. 10 and the link member 100 pivots to the position shown in FIG. 10 under the action of the tension spring 108 such that the engaging portion 102 prevents the locating pin from re-entering the hole 40'. The engaging portion 102 of the link member 100 has applied thereto a layer of material of high friction coefficient, such as rubber. Upon subsequent movement of the table 12 and therefore the indexing arrangement carried thereby, relative to the particular strip 36' of the indexing drum 30', the engaging portion 102, because of the friction engagement between it and the strip 36', tends to remain at a fixed position relative to the strip 36. The link member 100 is therefore caused to pivot about the pivot member 106 and back to the position shown in FIG. 9, thus moving the engaging portion 102 out of engagement with the locating pin while the table is being advanced to its next position, so that, the locating pin is free to automatically engage in the next hole 40' in the particular row in the strip 36' as soon as it is aligned therewith. The position of the table required for the next hole to be drilled in the batch of paper, is thus automatically set, and the automatic disengagement and engagement of the locating pin arrangement 48' is repeated until completion of the drilling of the necessary number of holes in the positions as dictated by the particular strip 36' of the indexing drum 30'.

Modifications and variations such as would be apparent to a skilled addressee in the art of drilling paper are deemed within the scope of the present invention. For example, the cylindrical surface of the drum 30 or 30' could be formed from a single sheet of material with the required rows formed therein. Also, the indexing members need not be recesses 40 or holes as shown, but any means which can be engaged in step wise manner. Also, the indexing means need not be a cylindrical drum. Any configuration which will enable different rows of indexing members to be engaged is within the scope of the present invention.

I claim:

1. A drilling apparatus comprising a vertically movable drilling head and a table for receiving material to be drilled, the drilling head and table being laterally movable relative to one another, said apparatus further comprising an indexing means having a plurality of rows of indexing members of pre-set spacing, and engaging means for stepwise indexing engagement with the indexing members of a selected row, whereby the material can be drilled with a desired arrangement of holes at a pre-set spacing, wherein means are provided to automatically disengage said engaging means from an indexing member in response to the completion of the drilling operation, together with movable means, movable in response to the disengagement of said engaging means, to hold said engaging means out of engagement with said indexing members until after said engaging means and said indexing member have moved out of alignment and prior to alignment of said engaging means with the next indexing member of said selected row, said movable means moving into a position between the engaging means and the indexing members and acting to hold the engaging means out of engagement until alignment of said engaging means with the next indexing member.

2. A drilling apparatus as claimed in claim 1, wherein the indexing means comprises an axially rotatable generally cylindrical indexing drum having the indexing members located in rows on its circular surface.

3. A drilling apparatus as claimed in claim 2, wherein an end surface of the indexing drum is provided with a plurality of notches each corresponding with a respective row of indexing members, and means is provided for engagement with the notch corresponding to a selected row.

4. A drilling apparatus as claimed in claim 1, in which the indexing members are holes or recesses.

5. A drilling apparatus as claimed in claim 4, in which the engaging means comprises pin means for sequential indexing engagement with each member of a row of the indexing members.

6. A drilling apparatus as claimed in claim 1, wherein the drill head is laterally fixed and the table is movable in the lateral direction, the indexing means being arranged to engage indexing engagement means associated with the table.

7. A drilling apparatus as claimed in claim 1, which is a paper drilling apparatus and in which the indexing means has a plurality of rows of indexing members which are at a spacing corresponding to conventional spacing of holes drilled in paper.

8. A drilling apparatus as claimed in claim 1, including lubricating means for the drill bit comprising means for urging a lubricating stick of solid lubricant into engagement with the drill bit.

9. An indexing attachment for a drilling apparatus comprising an indexing means having a plurality of rows of indexing members of pre-set spacing, and engaging means for stepwise indexing engagement with the indexing members of a selected row, whereby, when said indexing attachment is attached to a drilling apparatus, material can be drilled with a desired arrangement of holes at a pre-set spacing, wherein means are provided to automatically disengage said engaging means from an indexing member in response to the completion of the drilling operation, together with movable means, movable in response to the disengagement of said engaging means, to hold said engaging means out of engagement with said indexing members until after said engaging means and said indexing members have moved out of alignment and prior to alignment of said engaging means with the next indexing member of said selected row, said movable means moving into a position between the engaging means and the indexing members and acting to hold the engaging means out of engagement until alignment of said engaging means with the next indexing member.

10. A drilling apparatus comprising a vertically movable drilling head and a table for receiving material to be drilled, the drilling head and table being laterally movable relative to one another, wherein there is attached to the apparatus an indexing means having a plurality of rows of indexing members of pre-set spacing, and engaging means for stepwise indexing engagement with the indexing members of a selected row, whereby the material can be drilled with a desired arrangement of holes at a pre-set spacing, said apparatus further including lubricating means for the drill bit comprising means for urging a lubricating stick of solid lubricant into engagement with the drill bit, the lubricating means depending from the drilling head and comprising a boss member arranged to rest on a material being drilled, said boss member containing the means for urging a lubricating stick into engagement with the drill bit.

11. A drilling apparatus as claimed in claim 10, wherein the indexing means comprises an axially rotatable generally cylindrical indexing drum having the indexing members located in rows on its circular surface.

12. A drilling apparatus as claimed in claim 11, wherein an end surface of the indexing drum is provided with a plurality of notches each corresponding with a respective row of indexing members, and means is provided for engagement with the notch corresponding to a selected row.

13. A drilling apparatus as claimed in claim 10, in which the indexing members are holes or recesses.

14. A drilling apparatus as claimed in claim 13, in which the engaging means comprises pin means for sequential indexing engagement with each member of a row of the indexing members.

15. A drilling apparatus as claimed in claim 10, wherein the drill head is laterally fixed and the table is movable in the lateral direction, the indexing means being arranged to engage indexing engagement means associated with the table.

16. A drilling apparatus as claimed in claim 10, which is a paper drilling apparatus and in which the indexing means has a plurality of rows of indexing members which are at a spacing corresponding to conventional spacing of holes drilled in paper.

* * * * *